United States Patent
Kim et al.

(10) Patent No.: US 10,491,260 B2
(45) Date of Patent: Nov. 26, 2019

(54) METHOD FOR CONTROLLING SELF-INTERFERENCE DUPLICATION SIGNAL FOR REMOVING SELF-INTERFERENCE IN ENVIRONMENT SUPPORTING FULL-DUPLEX RADIO (FDR) COMMUNICATION, AND APPARATUS THEREFOR

(71) Applicants: LG ELECTRONICS INC., Seoul (KR); INDUSTRY-ACADEMIC COOPERATION FOUNDATION, YONSEI UNIVERSITY, Seoul (KR)

(72) Inventors: Dongkyu Kim, Seoul (KR); Donghyun Lee, Gwacheon-si (KR); Byung-Wook Min, Seoul (KR); Kwangseok Noh, Seoul (KR)

(73) Assignees: LG Electronics Inc., Seoul (KR); Industry-Academic Cooperation Foundation, Yonsei University, Seoul (KR)

(*) Notice: Subject to any disclaimer, the term of this patent is extended or adjusted under 35 U.S.C. 154(b) by 39 days.

(21) Appl. No.: 15/770,112

(22) PCT Filed: Oct. 21, 2015

(86) PCT No.: PCT/KR2015/011146
§ 371 (c)(1),
(2) Date: Apr. 20, 2018

(87) PCT Pub. No.: WO2017/069300
PCT Pub. Date: Apr. 27, 2017

(65) Prior Publication Data
US 2018/0309475 A1  Oct. 25, 2018

(51) Int. Cl.
*H04B 1/525* (2015.01)
*H04B 15/02* (2006.01)
(Continued)

(52) U.S. Cl.
CPC .......... *H04B 1/525* (2013.01); *H04B 1/0475* (2013.01); *H04B 15/02* (2013.01); *H04B 17/19* (2015.01);
(Continued)

(58) Field of Classification Search
None
See application file for complete search history.

(56) References Cited

U.S. PATENT DOCUMENTS 9,136,883 B1   9/2015 Moher et al.
9,490,866 B2 * 11/2016 Goel .................... H04B 1/525
(Continued)

FOREIGN PATENT DOCUMENTS

JP     2013500659 A    1/2013
KR    1020090080541 A  7/2009
(Continued)

*Primary Examiner* — Andrew C Oh
(74) *Attorney, Agent, or Firm* — Dentons US LLP

(57) ABSTRACT

A method for an apparatus that supports full-duplex radio (FDR) communication controlling a self-interference duplication signal for removing self-interference comprises the steps of: transmitting two reference signals; and measuring the power of the two reference signals that arrive as self-interference signals; and a self-interference duplication generation unit for duplicating and generating a self-interference signal including three elements controlling two elements of the three elements based on the measured power of a first reference signal of the two reference signals, and controlling the remaining element based on the measured power of a second reference signal, wherein the three elements comprise a time delayer, a phase shifter and an attenuator, and the two reference signals are orthogonal to each other.

16 Claims, 10 Drawing Sheets

(51) Int. Cl.
*H04B 17/19* (2015.01)
*H04B 1/04* (2006.01)
*H04L 5/14* (2006.01)
*H04L 25/02* (2006.01)

(52) U.S. Cl.
CPC ............ *H04L 5/14* (2013.01); *H04L 25/0204* (2013.01); *H04L 25/0224* (2013.01)

(56) References Cited

U.S. PATENT DOCUMENTS

| | | | | |
|---|---|---|---|---|
| 9,712,233 | B1* | 7/2017 | Deng | H04B 10/11 |
| 10,205,585 | B2* | 2/2019 | Griffiths | H04B 1/109 |
| 2004/0240588 | A1* | 12/2004 | Miller | H04K 1/00 |
| | | | | 375/340 |
| 2005/0226353 | A1 | 10/2005 | Gebara et al. | |
| 2009/0034437 | A1 | 2/2009 | Shin et al. | |
| 2009/0227213 | A1 | 9/2009 | Sadeghfam et al. | |
| 2010/0197231 | A1 | 8/2010 | Kenington | |
| 2011/0171920 | A1 | 7/2011 | Kim et al. | |
| 2012/0063369 | A1* | 3/2012 | Lin | H04B 7/15542 |
| | | | | 370/279 |
| 2012/0147790 | A1* | 6/2012 | Khojastepour | H01Q 3/2605 |
| | | | | 370/277 |
| 2012/0230368 | A1 | 9/2012 | Smiley | |
| 2012/0263078 | A1* | 10/2012 | Tung | H04B 7/15564 |
| | | | | 370/277 |
| 2013/0191984 | A1 | 8/2013 | League | |
| 2014/0219139 | A1* | 8/2014 | Choi | H04L 5/1461 |
| | | | | 370/278 |
| 2014/0318018 | A1 | 10/2014 | Huang | |
| 2014/0348018 | A1* | 11/2014 | Bharadia | H04L 5/1461 |
| | | | | 370/252 |
| 2014/0376419 | A1* | 12/2014 | Goel | H04B 1/525 |
| | | | | 370/278 |
| 2015/0043685 | A1* | 2/2015 | Choi | H04L 5/143 |
| | | | | 375/346 |
| 2015/0103802 | A1* | 4/2015 | Cheng | H04L 5/0048 |
| | | | | 370/330 |
| 2015/0180640 | A1* | 6/2015 | Liu | H04B 1/525 |
| | | | | 370/278 |
| 2015/0215937 | A1* | 7/2015 | Khandani | H04W 76/10 |
| | | | | 370/277 |
| 2015/0280893 | A1* | 10/2015 | Choi | H04B 1/525 |
| | | | | 370/281 |
| 2015/0303984 | A1* | 10/2015 | Braithwaite | H04B 1/525 |
| | | | | 455/78 |
| 2015/0311928 | A1* | 10/2015 | Chen | H04B 1/525 |
| | | | | 375/350 |
| 2015/0311985 | A1* | 10/2015 | Kim | H04B 15/00 |
| | | | | 455/501 |
| 2015/0318976 | A1* | 11/2015 | Eltawil | H04B 1/123 |
| | | | | 370/278 |
| 2016/0087715 | A1* | 3/2016 | Kim | H04L 5/14 |
| | | | | 370/280 |
| 2016/0112226 | A1* | 4/2016 | Martinez | H04L 27/2003 |
| | | | | 455/110 |
| 2016/0119110 | A1* | 4/2016 | Kim | H04B 1/123 |
| | | | | 370/278 |
| 2016/0127114 | A1* | 5/2016 | Kim | H04B 17/345 |
| | | | | 370/252 |
| 2016/0143013 | A1* | 5/2016 | Kim | H04B 17/345 |
| | | | | 370/329 |
| 2016/0226653 | A1* | 8/2016 | Bharadia | H04B 1/525 |
| 2016/0249245 | A1* | 8/2016 | Kim | H04B 17/345 |
| 2016/0285486 | A1* | 9/2016 | Qin | H04B 1/1027 |
| 2016/0285504 | A1* | 9/2016 | Hua | H04B 1/123 |
| 2017/0041060 | A1* | 2/2017 | Kim | H04B 15/02 |
| 2017/0230159 | A1* | 8/2017 | Noh | H04B 7/26 |
| 2017/0250677 | A1* | 8/2017 | Zhou | H03H 19/002 |
| 2017/0273091 | A1* | 9/2017 | Noh | H04W 72/082 |

FOREIGN PATENT DOCUMENTS

| | | |
|---|---|---|
| WO | 2014133625 A2 | 9/2014 |
| WO | 2014208953 A1 | 12/2014 |

\* cited by examiner

METHOD FOR CONTROLLING SELF-INTERFERENCE DUPLICATION SIGNAL FOR REMOVING SELF-INTERFERENCE IN ENVIRONMENT SUPPORTING FULL-DUPLEX RADIO (FDR) COMMUNICATION, AND APPARATUS THEREFOR This application is a National Stage Application of International Application No. PCT/KR2015/011146, filed on Oct. 21, 2015, all of which are hereby incorporated by reference in their entirety for all purposes as if fully set forth herein.

TECHNICAL FIELD

The present invention relates to wireless communication, and more specifically, to a method for controlling a self-interference reference signal for self-interference cancellation in an environment supporting FDR and an apparatus therefor.

BACKGROUND ART

Compared to conventional half duplex communication in which time or frequency resources are divided orthogonally, full duplex communication doubles a system capacity in theory by allowing a node to perform transmission and reception simultaneously.

FIG. 1 is a conceptual view of a UE and a Base Station (BS) which support Full Duplex Radio (FDR).

In the FDR situation illustrated in FIG. 1, the following three types of interference are produced.

Intra-device self-interference: Because transmission and reception take place in the same time and frequency resources, a desired signal and a signal transmitted from a BS or UE are received at the same time at the BS or UE. The transmitted signal is received with almost no attenuation at a Reception (Rx) antenna of the BS or UE, and thus with much larger power than the desired signal. As a result, the transmitted signal serves as interference.

UE to UE inter-link interference: An Uplink (UL) signal transmitted by a UE is received at an adjacent UE and thus serves as interference.

BS to BS inter-link interference: The BS to BS inter-link interference refers to interference caused by signals that are transmitted between BSs or heterogeneous BSs (pico, femto, and relay) in a HetNet state and received by an Rx antenna of another BS.

Among such three types of interference, intra-device self-interference (hereinafter, self-interference (SI)) is generated only in an FDR system to significantly deteriorate performance of the FDR system. Therefore, first of all, intra-device SI needs to be cancelled in order to operate the FDR system.

DISCLOSURE

Technical Problem

An object of the present description is to provide a method by which an apparatus supporting Full Duplex Radio (FUR) controls a self-interference reference signal for self-interference cancellation.

Another object of the present description is to provide an apparatus for controlling a self-interference reference signal for self-interference cancellation in an environment supporting FDR.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

To accomplish the objects, a method for controlling a self-interference reference signal for self-interference cancellation, by an apparatus supporting Full Duplex Radio (FDR) mode, includes; transmitting two reference signals; measuring powers of the two reference signals received as self-interference signals; and controlling, by a self-interference reference generator including three elements and generating a self-interference reference signal, two of the three elements based on a measured power of a first reference signal in the two reference signals and controlling a remaining element based on a measured power of a second reference signal in the two reference signals, wherein the three elements include a time delay element, a phase shifter and an attenuator, and the two reference signals are orthogonal signals. The first reference signal may be composed of a sum of two orthogonal signals. The first reference signal may be a frequency signal within a guard band positioned at edge of a lower frequency in a data communication band of the apparatus. The second reference signal may be a frequency signal within a guard band positioned at the of a higher frequency in the data communication band of the apparatus. The two elements may include the phase shifter and the attenuator. The method may further include separately detecting the two signals from each other. One of the separately detected signals may be used to control the phase shifter and the other signal may be used to control the attenuator. The two elements may be controlled to minimize the measured power of the first reference signal and the remaining element may be controlled to minimize the measured power of the second reference signal.

To accomplish the objects, an apparatus for controlling a self-interference reference signal for self-interference cancellation in an environment supporting Full Duplex Radio (FDR) mode includes; a transmitting end for transmitting two reference signals; a receiving end for measuring powers of the two reference signals arriving as self-interference signals; and a self-interference reference generator including three elements and generating a self-interference reference signal; and a controller for controlling two of the three elements based on a measured power of a first reference signal in the two reference signals and a remaining element based on a measured power of a second reference signal in the two reference signals, wherein the three elements include a time delay element, a phase shifter and an attenuator, and the two reference signals are orthogonal signals. The first reference signal may be composed of a sum of two orthogonal signals. The first reference signal may be a frequency signal within a guard band positioned at edge of a lower frequency in a data communication band of the apparatus. The second reference signal may be a frequency signal within a guard band positioned at edge of a higher frequency in the data communication band of the apparatus. The two elements may include the phase shifter and the attenuator. The receiving side may separately detect the two signals from each other. One of the separately detected signals may be used to control the phase shifter and the other signal may be used to control the attenuator. The controller may control the two elements to minimize the measured power of the first reference signal and control the remaining element to minimize the measured power of the second reference signal.

Advantageous Effects

According to an embodiment of the present invention, it is possible to trace and compensate for self-interference channel variation and circuit fault over time.

Furthermore, it is possible to maintain high self-interference cancellation performance while continuously receiving a desired reception signal by controlling a self-interference reference generator using two reference signals at frequencies of guard bands at both edges of a communication band.

In addition, it is possible to efficiently control a self-interference reference generator using two reference signals in an in-band by separating a data communication time from a self-interference reference generator control time.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

BEST MODE

Figure 1:
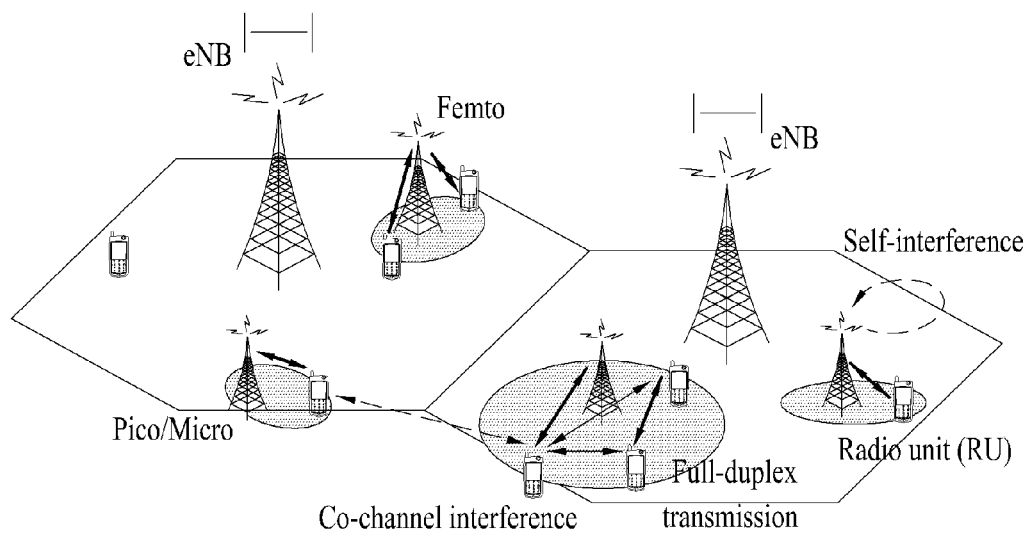
FIG. 1 is a diagram illustrating a network supporting full duplex/half duplex communication methods of UEs proposed by the present invention.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on IEEE 802.16m system, contents of the present invention may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs OFDMA in DL and SC-FDMA in UL. And, LTE-A (LTE-Advanced) is an evolved version of 3GPP LTE.

Moreover, in the following description, specific terminologies are provided to help the understanding of the present invention. And, the use of the specific terminology can be modified into another form within the scope of the technical idea of the present invention.

Figure 2:
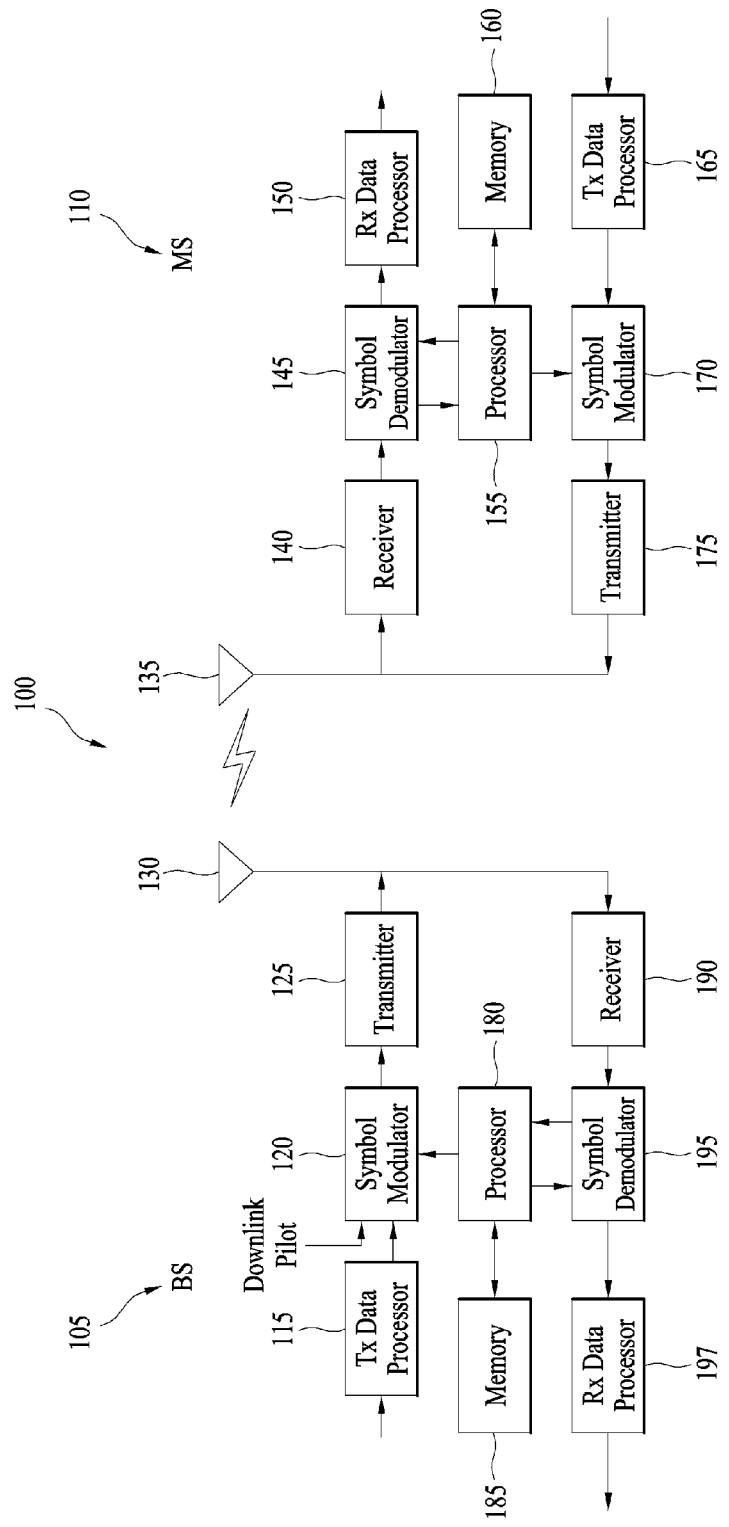
FIG. 2 is a block diagram showing configurations of a base station 105 and a UE 110 in a wireless communication system 100.

FIG. 2 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 2, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmission data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmission data processor 115 in the base station 105, respectively.

In the user equipment 110 in uplink, the transmission data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

Figure 3:
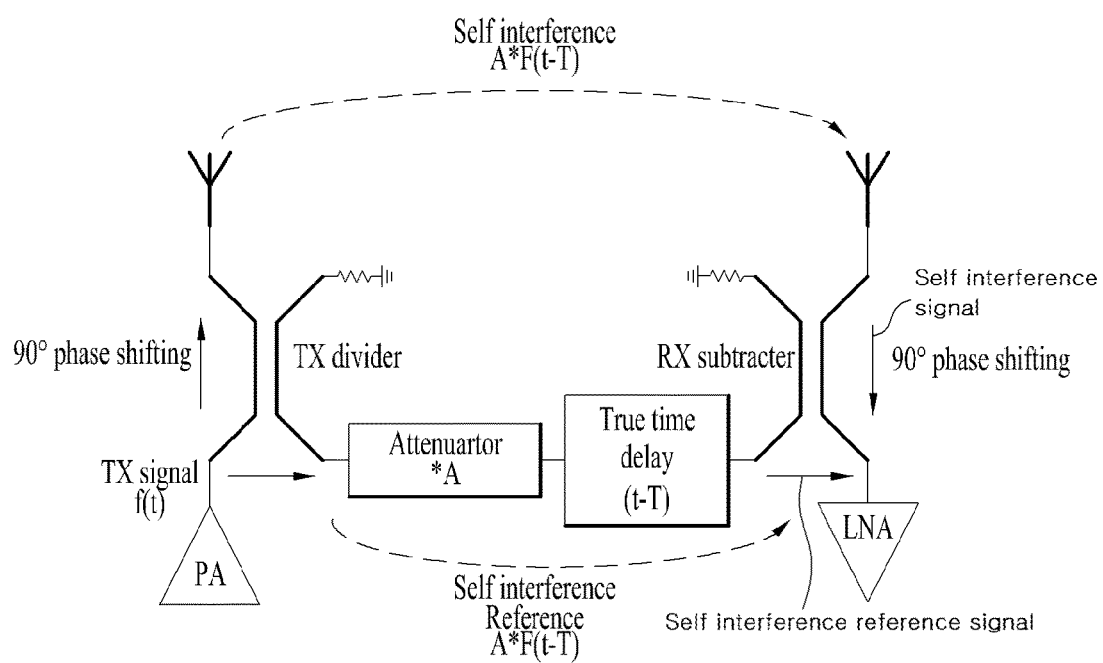
FIG. 3 illustrates the concept of a transmission/reception link and self-interference (SI) in RF chains of a communication apparatus in an FDR communication situation.

FIG. 3 illustrates the concept of a transmission/reception link and self-interference (SI) in RF chains of a communication apparatus in an FDR communication situation.

As shown in FIG. 3, self-interference signals may be divided into direct interference produced when a signal transmitted from a transmission antenna is directly input to a reception antenna without pathloss and reflected interference produced when the signal is reflected due to surrounding geographical features, and the intensity of the self-interference signals is extremely greater than a desired signal due to a physical distance difference. It is necessary to effectively cancel self-interference signals for FDR system operation because of extremely high interference intensity.

Figure 4:
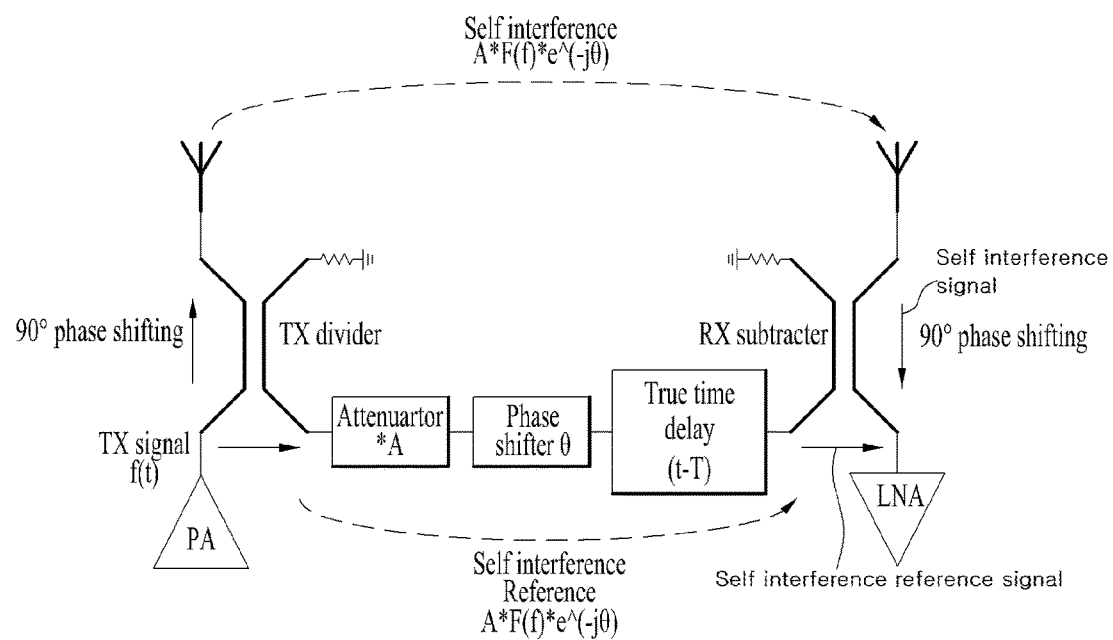
FIG. 4 is a diagram showing an RF chain (or RF frontend) structure of a communication apparatus for cancelling self-interference signals according to the present invention.

FIG. 4 is a diagram showing an RF chain (or RF front-end) structure of a communication apparatus for self-interference signal cancellation according to the present invention.

Since it is difficult for 90° directional couplers used as a transmitted signal divider (TX divider) and a received signal subtractor (RX subtractor) to generate a perfect 90° phase difference, it is difficult to generate exact 180° phase difference between a self-interference signal and a reference self-interference signal. In addition, the phases of self-interference signals change when the signals pass through antennas and communication channels, and thus self-interference cancellation is impossible even if an exact 180° phase difference between the self-interference signals is generated. To solve this problem, addition of a phase shifting circuit (or phase shifter) to a reference self-interference signal generator including an attenuator and a time delayer (true time delay or true time delay) circuit) as shown in FIG. 4 may be conceived. The true time delay refers to a circuit for shifting a signal in parallel over time when the signal is viewed in the time domain. The true time delay refers to a circuit for linearly shifting the phase of a signal over frequency (changing a phase-to-frequency gradient) when the signal is viewed in the frequency domain. The phase shifter refers to a circuit for shifting the phase of a signal while maintaining a phase-to-frequency gradient in the entire frequency domain when the signal is viewed in the frequency domain.

In FIG. 4, the phase shifter is positioned between the attenuator and the true time delay, attenuates a signal coming from the TX divider, delays the phase of the signal, delays time of the phase-delayed signal and sends the signal to a receiving end. However, the position of the phase shifter is not limited thereto. In this manner, a phase delay value for application of phase delay may be determined as a value that makes the sum of a reference self-interference signal and a self-interference signal to which the phase delay value is applied become less than a predetermined value (e.g., −30 dB).

As shown in FIG. 4, the RF chain requires a self-interference reference signal generator for self-interference signal cancellation in the FDR communication environment, and the self-interference reference signal generator needs to include the attenuator, the phase shifter and the true time delay. There are three variables that need to be controlled in order to reference a self-interference channel, and the variables are bias voltages applied to the attenuator, the phase shifter and the true time delay (or true time delay circuit).

A method of controlling the circuits is chronologically described. First, attenuation of an SI reference path is maximized in order to estimate an SI channel in a modem, and then a test transmission signal is transmitted to measure the SI channel. Control voltage 1, control voltage 2 and control voltage 3 which are the best voltages capable of referencing the SI channel are output to an SI reference generator.

Figure 5:
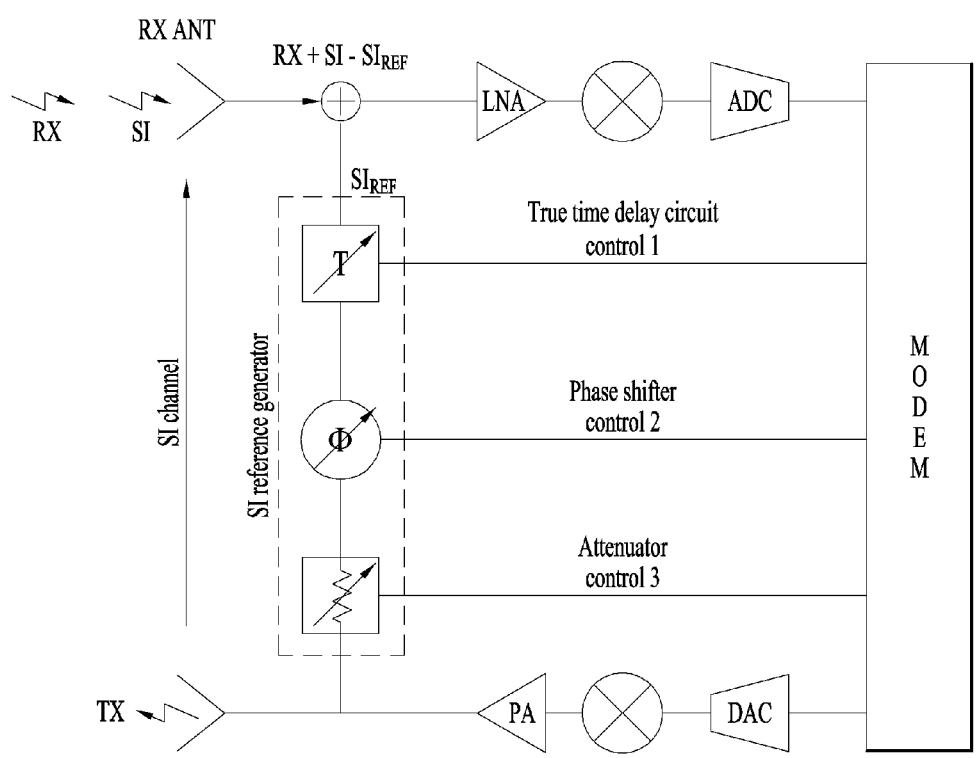
FIG. 5 is a diagram showing an RF chain of a communication apparatus for performing normal full duplex radio (FDR).

FIG. 5 is a diagram showing an RF chain of a communication apparatus for performing normal FDR.

In FIG. 5, to detect the best control voltage 1 (i.e., voltage input to a true time delay), control voltage 2 (voltage input to a phase shifter) and control voltage 3 (voltage input to an attenuator), SI channel estimation needs to be performed first. Here, an SI reference path and a desired RX signal should not be applied. That is, there is a problem that a mechanism for controlling an SI reference generator does not continuously operate in time. Furthermore, even though perfect SI channel estimation has been performed, detection of best control voltage 1, control voltage 2 and control voltage 3 according thereto requires very precise calibration of SI reference path channels according to combination of control voltage 1, control voltage 2 and control voltage 3 of the SI signal reference generator. A look-up table of SI reference path channels needs to be created on the basis of combinations of control voltage 1, control voltage 2 and control voltage 3. Even when a look-up table which is correct at a specific TX power and temperature has been created, this varies according to original TX power and circuit temperature and thus SI cancellation performance may deteriorate due to a calibration error, current TX power and temperature, and a condition difference at look-up table creation time. Methods for solving this problem will be described as various embodiments below.

Figure 6:
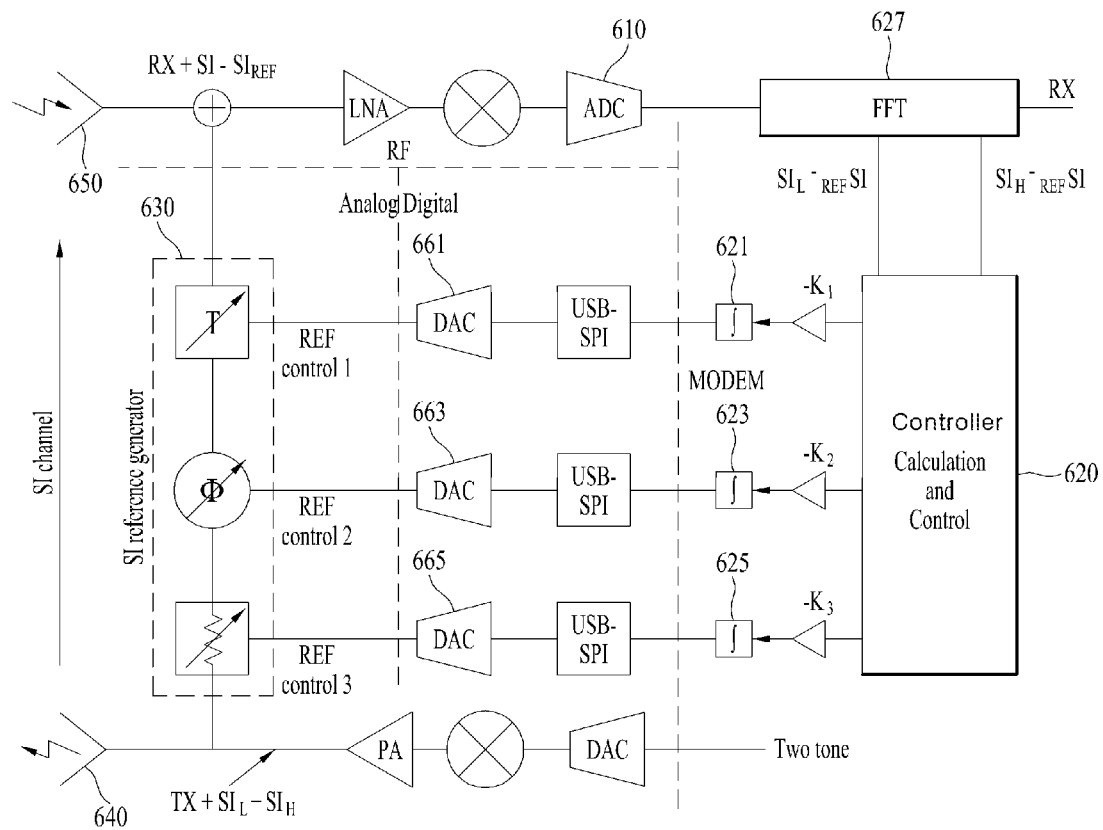
FIG. 6 is a diagram showing a method for controlling generation of a self-interference reference signal for self-interference cancellation in an FDR communication environment and an example of an RF chain structure for the same.

FIG. 6 is a diagram showing a method for controlling generation of an SI reference signal for SI cancellation in an FDR communication environment and an example of an RF chain structure therefor.

Referring to FIG. 6, an RF chain 610 of a communication apparatus may include a controller 620, an SI reference generator 630, a TX antenna 640 and an RX antenna 650. The controller 620 may include a Fast Fourier Transform (FFT) unit 627 and integrators 621, 623 and 625.

To control most accurate SI reference signal generation, an analog attenuator 633, an analog phase shifter 635 and an analog true time delay 637 are used and thus digital-to-analog converters (DACs) 661, 6653 and 665 for converting control signals output from the controller 620 into analog signals are provided.

True time delay cannot be controlled only using information at a single frequency due to the concept of true time delay defined as a phase shift-to-frequency band gradient. Accordingly, information at two or more frequencies needs to be known in order to perform SI cancellation (SIC) over a wide band and thus two pilots, two reference signals or two tones, which are test signals, are assumed.

To control an SI reference generator including only an attenuator and a phase shifter, acquisition of information for control is sufficient only using a single tone. A method proposed by the present invention is a normal feedback control method capable of controlling any type of SI reference generator to minimize a specific quantity (power of an SI signal) and thus is applicable to the aforementioned SI reference generator.

In the present invention, the method for controlling an SI reference generator may be normalized as shown in FIG. 6. The SI reference generator is controlled in such a manner that two pilot signals, two reference signals or two tones, which are test signals $S_{IL}$ and $S_{IH}$, are transmitted and a receiving end checks the two pilot signals, two reference signals or two tones corresponding to the test signals and minimizes the test signals. Here, a current control signal is automatically calculated in a feedback loop based on the current power and a previous control signal in the controller 620. Calculation and control in the controller 620 of FIG. 6 are illustrated in detail in FIGS. 7 and 8 and operation principles are as follows.

Meanwhile, loop gains $K_1$, $K_2$ and $K_3$ in FIG. 6 may be considered to be a step size for detecting control voltages 1, 2 and 3 and they function as follows. If a very large loop gain is set when each feedback loop operates to detect control voltages 1, 2 and 3 for minimizing an SI signal, control voltages 1, 2 and 3 suitable for the environment can be detected very rapidly. However, when a very large loop gain is set, an error is considerable when a control value error is generated and the feedback loop may oscillate even after stabilization, resulting in deterioration of accuracy of SI cancellation performance. On the contrary, if a very small loop gain is set, control voltages 1, 2 and 3 are detected very slowly but an error is insignificant when a control value error is generated and SI cancellation performance is very high after stabilization. That is, a large loop gain may be set such that the SI reference generator can follow surrounding environment variation if the surrounding environment of antennas changes very rapidly, whereas a small loop gain may be set to improve SI cancellation performance if the surrounding environment of the antennas changes slowly. In this manner, a user can set an optimal loop gain depending on surrounding environment change. That is, loop gains $K_1$, $K_2$ and $K_3$ may be variably controlled according to antenna environment variation.

Figure 7:
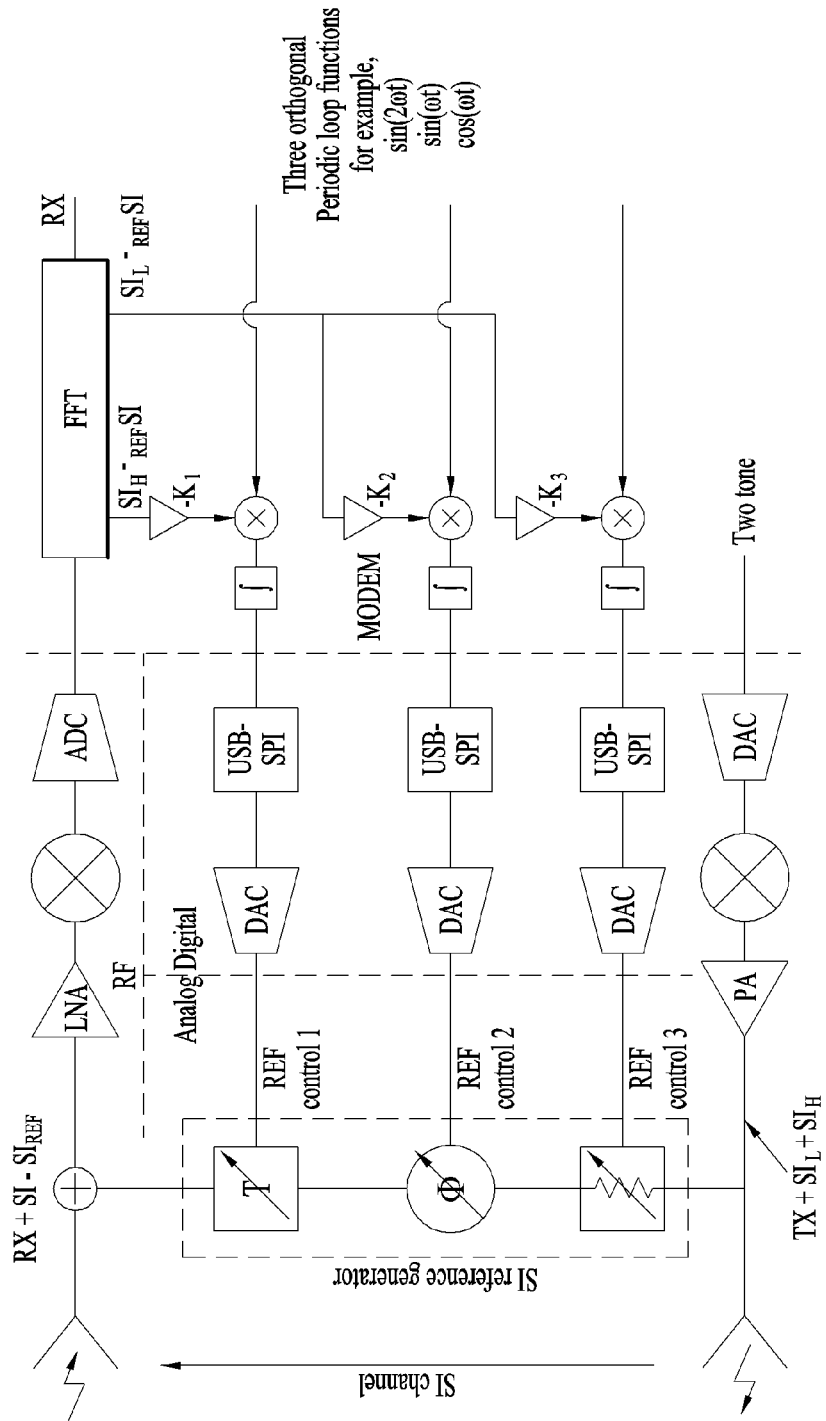
FIG. 7 is a diagram showing an example of a specific configuration of a controller 620 in FIG. 6.

FIG. 7 is a diagram showing an example of a specific configuration of the controller 620 in FIG. 6.

FIG. 7 illustrates a method of using $SI_L$ to control the phase shifter and the attenuator of the SI reference generator and using $SI_H$ along with $SI_L$ to control the true time delay (or true time delay circuit), the role of $SI_H$ and $SI_L$ may reversed from each other. The first tone $SI_L$ is used to control the phase shifter and the attenuator of the SI reference generator (controlling for control voltage 2 and control voltage 3 in FIG. 7) and the second tone $SI_H$ is used along with $SI_L$ to control the true time delay (or true time delay circuit). A method of controlling the phase shifter and the attenuator is as follows. When a transmitting end of an apparatus transmits $SI_L$, a receiving end measures the power of $SI_L$ and configures feedback loops for controlling the phase shifter and the attenuator based on information on the measured power of $SI_L$ as shown in FIG. 7.

Two of the three elements of the attenuator, the phase shifter and the true time delay in the SI reference generator may be controlled using $SI_L$ and the remaining element may be controlled using $SI_H$. On the contrary, two elements may be controlled using $SI_H$ and the remaining element may be controlled using $SI_L$.

The feedback loops are composed of appropriate loop gains and integrators, and optimal control voltages 2 and 3 for minimizing the power of $SI_L$ received at a reception channel are detected using the feedback loops. Any functions may be used as functions for operating the two control loops if the functions are two orthogonal periodic functions. The two orthogonal periodic functions serve to search all directions in a variable domain (which can be represented as a two-dimensional plane if the number of variables to be controlled is 2). For example, a square wave, sine and cosine functions correspond thereto. The two orthogonal signals can be orthogonal when they are time averaged.

On the other hand, control voltage 1 for controlling the true time delay (or true time delay circuit) cannot be controlled using only information of a single frequency due to characteristics of time delay and thus is detected using the information along with the power of the reference signal $SI_H$. To control voltage 1 independently of control voltage 2 and control voltage 3, a feedback loop for detecting control voltage 1 may be configured of any function if it is orthogonal to the aforementioned two functions configuring the feedback loops for detecting control voltages 2 and 3. For example, the function of the loop may be set to half or a multiple of the frequency of the loop functions controlling control voltages 2 and 3, as illustrated in FIG. 7, and control voltage 1 automatically follows to minimize the power of $SI_H$ as in the aforementioned two loops.

Assume that the phase shifter and the attenuator are controlled using the reference signal $SI_L$ and the true time delay is controlled using the reference signal $SI_H$, for example. $SI_L$ may be composed of the sum of orthogonal functions because it needs to control the two elements, the phase shifter 635 and the attenuator 637. For example, the reference signal $SI_L$ may be configured as $SI_L = \sin(wt) + \cos(wt)$ and the reference signal $SI_H$ may be configured as $S_{IH} = \sin(2\ wt)$. The reference signal $S_{IL} = \sin(wt) + \cos(wt)$ and the reference signal $S_{IH} = \sin(2\ wt)$ are two orthogonal periodic functions.

Accordingly, when a transmission chain transmits $SI_L = \sin(wt) + \cos(wt)$ and $SI_H = \sin(2\ wt)$, an FFT unit of a reception chain can separate $\sin(wt)$ and $\cos(wt)$ and separate $SI_H = \sin(2\ wt)$. Then, the FFT unit 627 may output the separated signals $\sin(wt)$ and $\cos(wt)$ to the circuit having the phase shifter loop gain $K_2$ and the circuit having the attenuator loop gain $K_3$ in order to control the phase shifter and the attenuator. The FFT unit may output the signal $SI_H = \sin(2\ wt)$ to the circuit having the true time delay loop gain $K_1$. That is, the signals output from the FFT unit are respectively multiplied by the phase shifter loop gain $K_2$, the attenuator loop gain $K_3$ and the true time delay loop gain $K_1$ and then input to the integrators included in the respective circuits.

Signals output from the integrators are converted into analog signals through the DACs and then used to control the true time delay, the phase shifter and the attenuator. When the reference signals $SI_L$ and $SI_H$ are transmitted after the aforementioned loop, the reception chain receives a "desired RX signal+SI–signal $SI_{REF}$ generated in the SI reference generator", and this loop is repeated until "SI–$SI_{REF}$ generated in the SI reference generator" is minimized.

Figure 8:
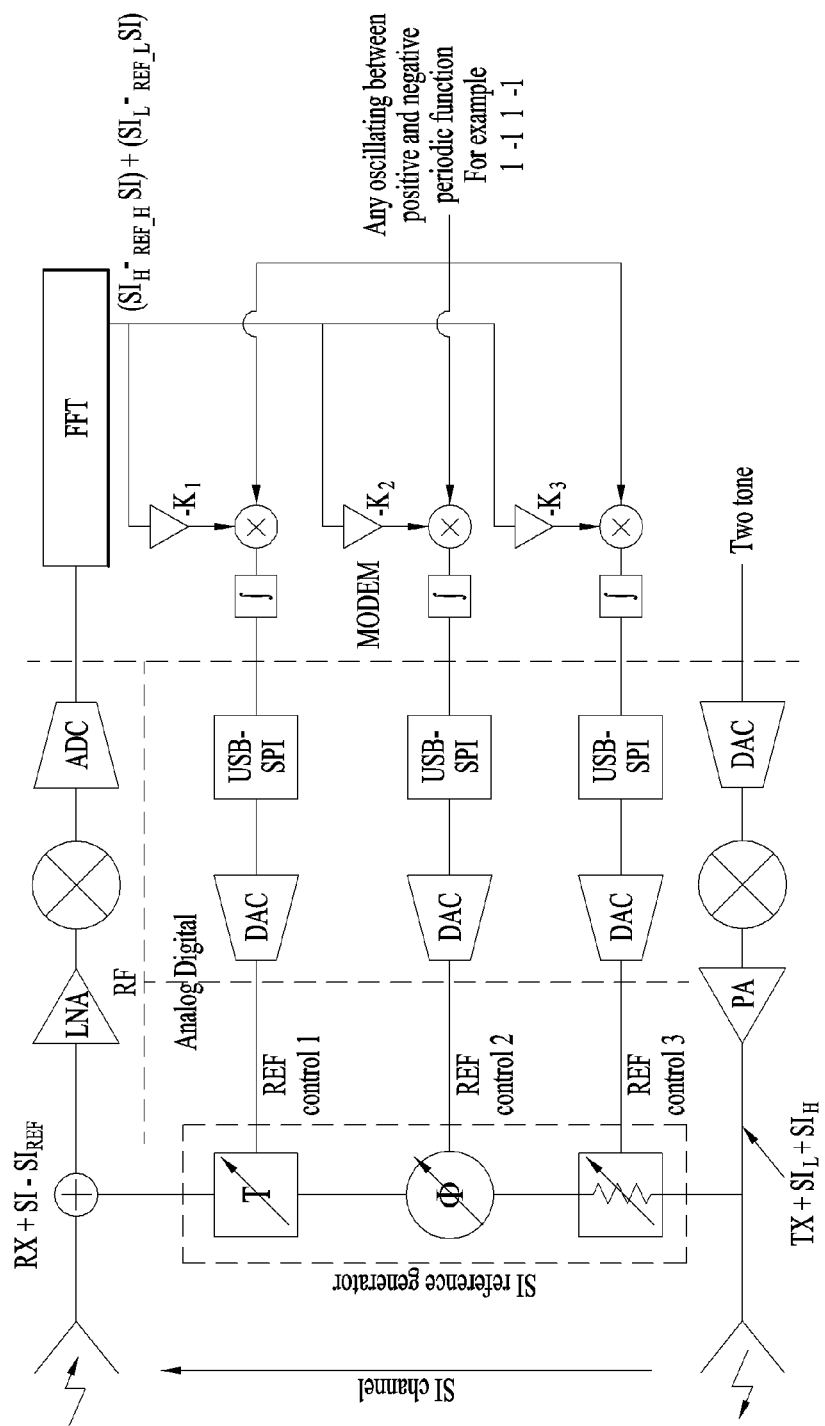
FIG. 8 is a diagram showing an example of a specific configuration of the controller 620 in FIG. 6.

FIG. 8 is a diagram showing an example of a specific configuration of the controller 620 in FIG. 6.

Figure 12:
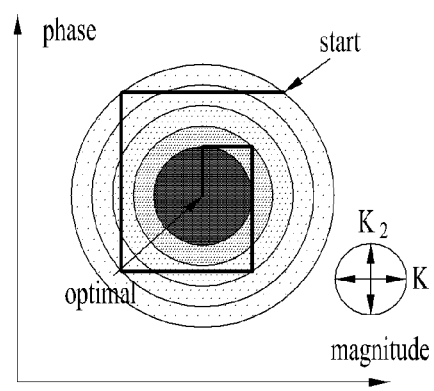
FIG. 12 is a diagram showing the concept of a process of tracing an optimal point starting from an initial start point when the power of a self-interference signal is controlled to be minimized using a phase shifter, an attenuator and a feedback loop, as shown in FIG. 8.

FIG. 8 shows a configuration in which the phase shifter, the attenuator and the true time delay (or true time delay circuit) of the SI reference generator are simultaneously controlled to minimize the sum of $SI_L$ and $SI_H$. FIG. 8 is distinguished from FIG. 7 in that the SI reference generator is controlled using a single variable corresponding to the sum of $SI_L$ and $SI_H$ to be minimized instead of $SI_L$ and $SI_H$. In addition, power checking or measurement is performed through a method of changing control voltage 1 and checking power, changing control voltage 2 and checking power and then changing control voltage 3 and checking power, instead of a method of simultaneously controlling control voltages 1, 2 and 3 applied to blocks of the SI reference generator and then checking power, that is, through a feedback method according to sequential control instead of a feedback method for simultaneously changing all control voltages and checking power. FIG. 12 illustrates a conceptual operation principle. This method has an advantage of rapid convergence on an optimal point only with a small number of iterations in the SI reference generator.

Methods for controlling the SI reference generator according to the present invention may be classified into two methods. The first method is a method of stopping communication and controlling the SI reference generator in accordance with SI channel situation and the second method is a method of controlling the SI reference generator while performing communication.

Figure 9:
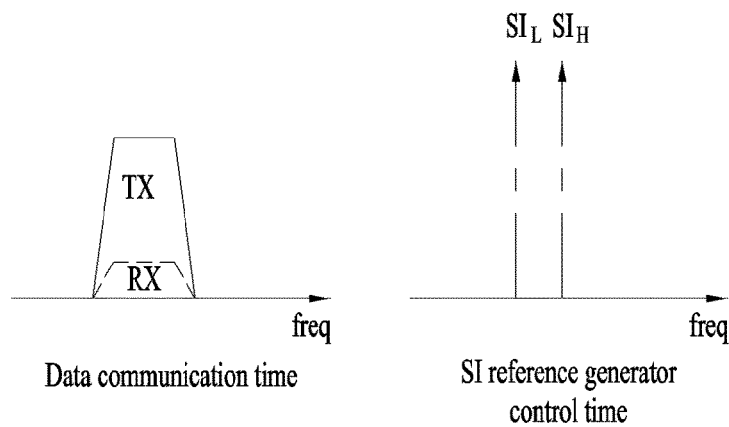
FIG. 9 is a diagram showing a method of transmitting reference signals for a method of stopping communication and controlling a self-interference reference generator in accordance with self-interference channel situation.
Figure 10:
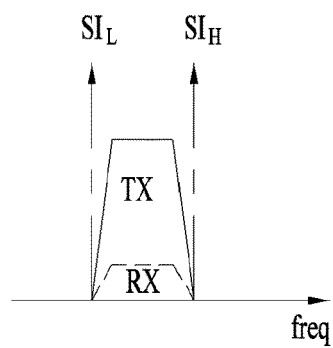
FIG. 10 is a diagram showing a method of transmitting reference signals for a method of controlling a self-interference reference generator while performing communication.

FIG. 9 is a diagram showing a method of transmitting reference signals for the method of stopping communication and controlling the SI reference generator in accordance with SI channel situation and FIG. 10 is a diagram showing a method of transmitting reference signals for the method of controlling the SI reference generator while performing communication.

In both the methods, a transmission chain transmits two reference signals $SI_L$, and $SI_H$ (pilot signals or tones) in FIGS. 9 and 10 in order to recognize an SI channel situation, a reception chain measures power of the two reference signals at frequencies corresponding to the two reference signals, and the SI reference generator is controlled on the basis of information on the measurement result.

In the first method, a data communication time and an SI reference generator control time are separately set because two reference signals (pilot signals or tones) are transmitted within a data communication band. In the second method, the SI reference generator can be controlled simultaneously with data communication because the reference signals are respectively transmitted at frequencies in guard bands positioned at both edges of a data communication band, as shown in FIG. 10. Since the SI reference generator is controlled on the basis of only power at the frequencies corresponding to the two reference signals input to the reception chain in the present invention, signal processing burden can be remarkably reduced compared to channel estimation performed in normal communication.

Figure 11:
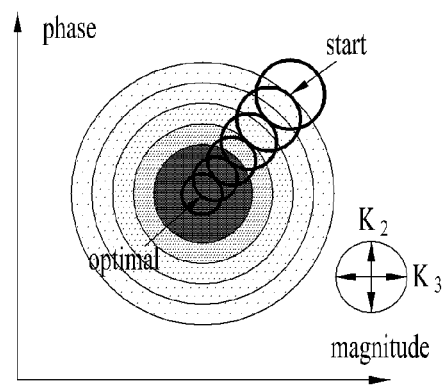
FIG. 11 is a diagram showing the concept of a process of tracing an optimal point starting from an initial start point when the power of a self-interference signal is controlled to be minimized using a phase shifter, an attenuator and a feedback loop, as shown in FIG. 7.

FIG. 11 is a diagram showing the concept of a process of tracing an optimal point starting from an initial start point when the power of an SI signal is controlled to be minimized using a phase shifter, an attenuator and a feedback loop, as shown in FIG. 7.

FIG. 11 illustrates how control voltages 1, 2 and 3 for controlling the phase shifter and the attenuator trace the optimal point from the initial start point in the case of FIG. 7. The figure shows a process of tracing the optimal point in a direction in which the power of $SI_L$ (or $SI_H$) is reduced while drawing circles around the initial start point according to a sine function and a cosine function, and integrators set in feedback loops shift current variable points in the corresponding direction.

FIG. 12 is a diagram showing the concept of a process of tracing an optimal point starting from an initial start point when the power of an SI signal is controlled to be minimized using a phase shifter, an attenuator and a feedback loop, as shown in FIG. 8.

FIG. 12 illustrates how control voltages 2 and 3 for controlling the phase shifter and the attenuator trace the optimal point from the initial start point in the case of FIG. 8. In this case, time delay also traces an optimal point in a similar manner if the process can be three-dimensionally described.

As described above, the methods according to an embodiment of the present invention can be continuously performed in time, differently from the conventional method having a procedure of measuring an SI channel, pre-calibrating an SI reference generator and creating a look-up table of the SI reference generator to control the SI reference generator, and thus can trace and compensate for SI channel variation and circuit fault with time in real time. In addition, since the SI reference generator is controlled using two reference signals at frequencies of guard bands of both edges of a communication band, it is possible to maintain high SI cancellation performance while continuously receiving a desired RX signal. Furthermore, it is possible to efficiently control the SI reference generator using two reference signals in an in-band by separating a data communication time from an SI reference generator control time.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

INDUSTRIAL APPLICABILITY

The method of controlling an SI reference signal for SI cancellation in an environment supporting FDR and the apparatus therefor are applicable to various wireless communication systems.

The invention claimed is:

1. A method for controlling a self-interference reference signal for self-interference cancellation, by an apparatus supporting Full Duplex Radio (FDR) mode, the method comprising;

transmitting two reference signals;

measuring powers of the two reference signals received as self-interference signals; and controlling, by a self-interference reference generator including three elements and generating a self-interference reference signal, two of the three elements based on a measured power of a first reference signal in the two reference signals a remaining element based on measured power of a second reference signal in the two reference signals, wherein the three elements include a time delay element, a phase shifter and an attenuator, and the two reference signals are orthogonal signals.

2. The method according to claim 1, wherein the first reference signal is composed of a sum of two orthogonal signals.

3. The method according to claim 1, wherein the first reference signal is a frequency signal within a guard band positioned at edge of a lower frequency in a data communication band of the apparatus.

4. The method according to claim 1, wherein the second reference signal is a frequency signal within a guard band positioned at edge of a higher frequency in a data communication band of the apparatus.

5. The method according to claim 1, wherein the two elements include the phase shifter and the attenuator.

6. The method according to claim 5, further comprising: detecting separately the two signals from each other.

7. The method according to claim 6, wherein one of the separately detected signals is used to control the phase shifter and the other signal is used to control the attenuator.

8. The method according to claim 1, wherein the two elements are controlled to minimize the measured power of the first reference signal and the remaining element is controlled to minimize the measured power of the second reference signal.

9. An apparatus for controlling a self-interference reference signal for self-interference cancellation in an environment supporting Full Duplex Radio (FDR) mode, the apparatus comprising;

a transmitting end for transmitting two reference signals;

a receiving end for measuring powers of the two reference signals received as self-interference signals; and a self-interference reference generator including three elements and generating a self-interference reference signal; and a controller for controlling two of the three elements based on a measured power of a first reference signal in the two reference signals and a remaining element based on a measured power of a second reference signal in the two reference signals, wherein the three elements include a time delay element, a phase shifter and an attenuator, and the two reference signals are orthogonal signals.

10. The apparatus according to claim 9, wherein the first reference signal is composed of a sum of two orthogonal signals.

11. The apparatus according to claim 9, wherein the first reference signal is a frequency signal within a guard band positioned at edge of a lower frequency in a data communication band of the apparatus.

12. The apparatus according to claim 9, wherein the second reference signal is a frequency signal within a guard band positioned at edge of a higher frequency in the data communication band of the apparatus.

13. The apparatus according to claim 9, wherein the two elements include the phase shifter and the attenuator.

14. The apparatus according to claim 13, wherein the receiving side separately detects the two signals from each other.

15. The apparatus according to claim 14, wherein one of the separately detected signals is used to control the phase shifter and the other signal is used to control the attenuator.

16. The apparatus according to claim 9, wherein the controller controls the two elements to minimize the measured power of the first reference signal and controls the remaining element to minimize the measured power of the second reference signal.

* * * * *